(12) United States Patent
Glazier et al.

(10) Patent No.: US 9,948,980 B2
(45) Date of Patent: Apr. 17, 2018

(54) SYNCHRONIZING AUDIO CONTENT TO AUDIO AND VIDEO DEVICES

(71) Applicant: GOOGLE INC., Mountain View, CA (US)

(72) Inventors: Adam Glazier, Oakland, CA (US); Tomer Shekel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/803,496

(22) Filed: Jul. 20, 2015

(65) Prior Publication Data

US 2017/0026686 A1  Jan. 26, 2017

(51) Int. Cl.
  *H04N 21/41*  (2011.01)
  *H04N 21/443*  (2011.01)
  (Continued)

(52) U.S. Cl.
  CPC ... *H04N 21/43615* (2013.01); *H04N 21/4126* (2013.01); *H04N 21/41407* (2013.01); *H04N 21/42204* (2013.01); *H04N 21/4307* (2013.01); *H04N 21/4438* (2013.01); *H04N 21/4782* (2013.01); *H04N 21/8173* (2013.01)

(58) Field of Classification Search
  None
  See application file for complete search history.

(56) References Cited

U.S. PATENT DOCUMENTS 8,483,853 B1  7/2013  Lambourne
8,792,429 B2 *  7/2014  Hassan ............... H04L 12/2818
                                                    370/329
(Continued)

FOREIGN PATENT DOCUMENTS

CA  2861790 A1  7/2013
EP  1940111 A2  7/2008
(Continued)

OTHER PUBLICATIONS

"How to Cast Your Digital Display to Multiple TVs Using Chromecast", available online at <http://help.beermenus.com/article/70-how-to-cast-your-digital-display-to-multiple-tvs-using-chromecast>, retrieved on Jul. 5, 2015, 7 pages.
(Continued)

*Primary Examiner* — Ricky Chin
(74) *Attorney, Agent, or Firm* — Brake Hughes Bellermann LLP

(57) ABSTRACT

In one general aspect, a method can include receiving, by a computing device, a selection of a group of devices that receive content under control of the computing device, and identifying a first device and a second device included in the group of devices. The computing device and each device included in the group of devices can be connected to a network. The first and second devices can be available to receive content, under the control of the computing device, from a server connected to the network that is remote from the group of devices and the computing device. The method can include providing an indication that the content be provided to the first device by the server and providing an indication that at least a portion of the content be provided to the second device synchronously with the providing of the content to the first device.

18 Claims, 12 Drawing Sheets

(51) Int. Cl.
  *H04N 21/414* (2011.01)
  *H04N 21/436* (2011.01)
  *H04N 21/422* (2011.01)
  *H04N 21/43* (2011.01)
  *H04N 21/4782* (2011.01)
  *H04N 21/81* (2011.01)

(56) References Cited

U.S. PATENT DOCUMENTS

| | | | |
|---|---|---|---|
| 8,875,214 B2 | 10/2014 | Ishihara et al. | |
| 2003/0073432 A1 | 4/2003 | Meade, II | |
| 2003/0229900 A1* | 12/2003 | Reisman | G06F 17/30873 725/87 |
| 2006/0149850 A1* | 7/2006 | Bowman | G11B 27/10 709/231 |
| 2006/0253874 A1* | 11/2006 | Stark | G06F 3/038 725/62 |
| 2009/0273705 A1 | 11/2009 | Matsumoto et al. | |
| 2010/0293598 A1* | 11/2010 | Collart | G06F 17/30056 726/3 |
| 2013/0169869 A1 | 7/2013 | Demoulin et al. | |
| 2014/0006947 A1 | 1/2014 | Garmark et al. | |
| 2014/0267908 A1* | 9/2014 | Hagenbuch | H04N 21/44027 348/552 |
| 2015/0010167 A1* | 1/2015 | Arling | H04N 21/42226 381/105 |
| 2016/0291925 A1 | 10/2016 | Kohara et al. | |

FOREIGN PATENT DOCUMENTS

| | | |
|---|---|---|
| JP | 2015-100085 A | 5/2015 |
| WO | 2013/015471 A1 | 1/2013 |

OTHER PUBLICATIONS

"Simultaneously cast multiple Chrome tabs to different Chromecasts?", Android Central Forums, available online at <http://forums.androidcentral.com/google-chromecast/311672-simultaneously-cast-multiple-chrome-tabs-different-chromecasts.html>, retrieved on Jul. 5, 2015, 8 pages.

"Casting to Two Different Tv's Using Same Device/On Same Network", Google Product Forums, available online at <https://productforums.google.com/forum/#!topic/chromecast/K2Wf61R6mkE>, retrieved on Jul. 20, 2015, 2 pages.

"Sonos", available online at <http://www.sonos.com/system>, retrieved on Jul. 5, 2015, 6 pages.

International Search Report and Written Opinion received for PCT Patent Application No. PCT/US2016/042227, dated Sep. 22, 2016, 15 pages.

* cited by examiner

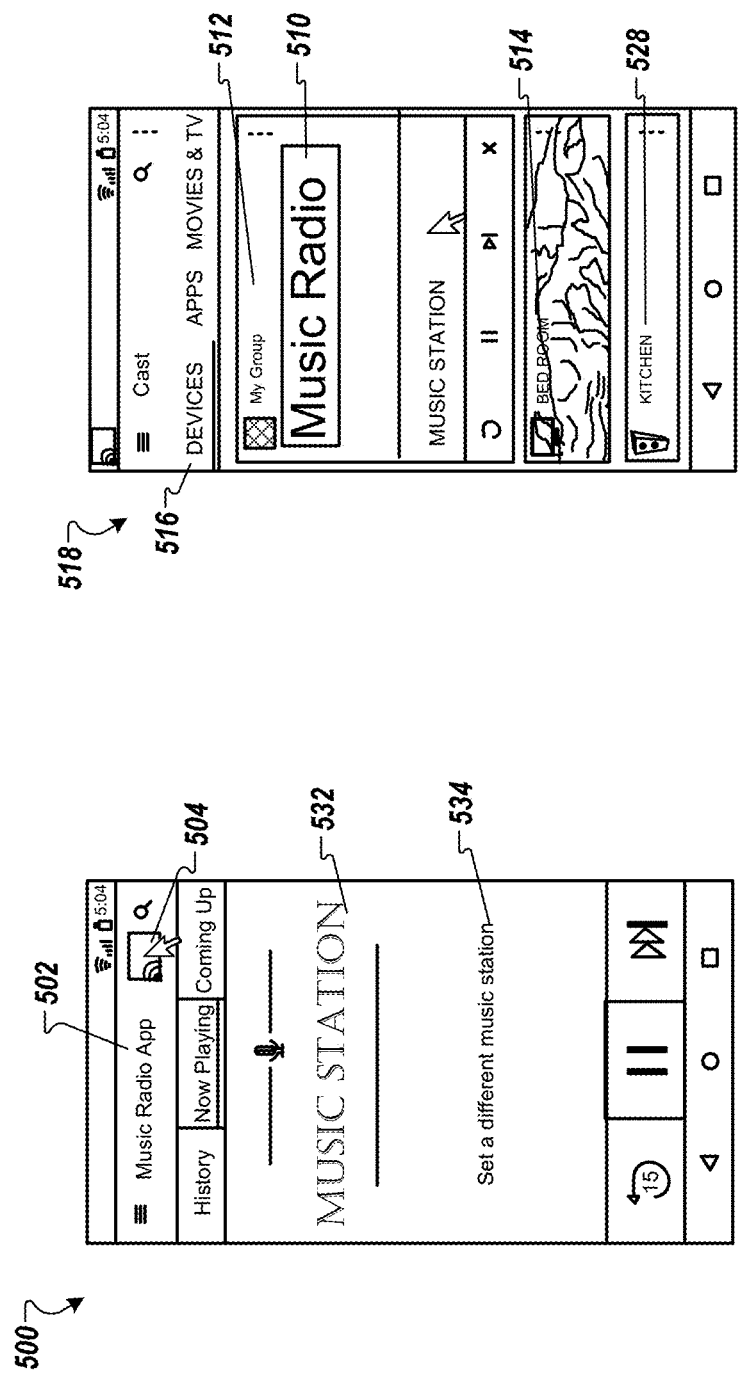

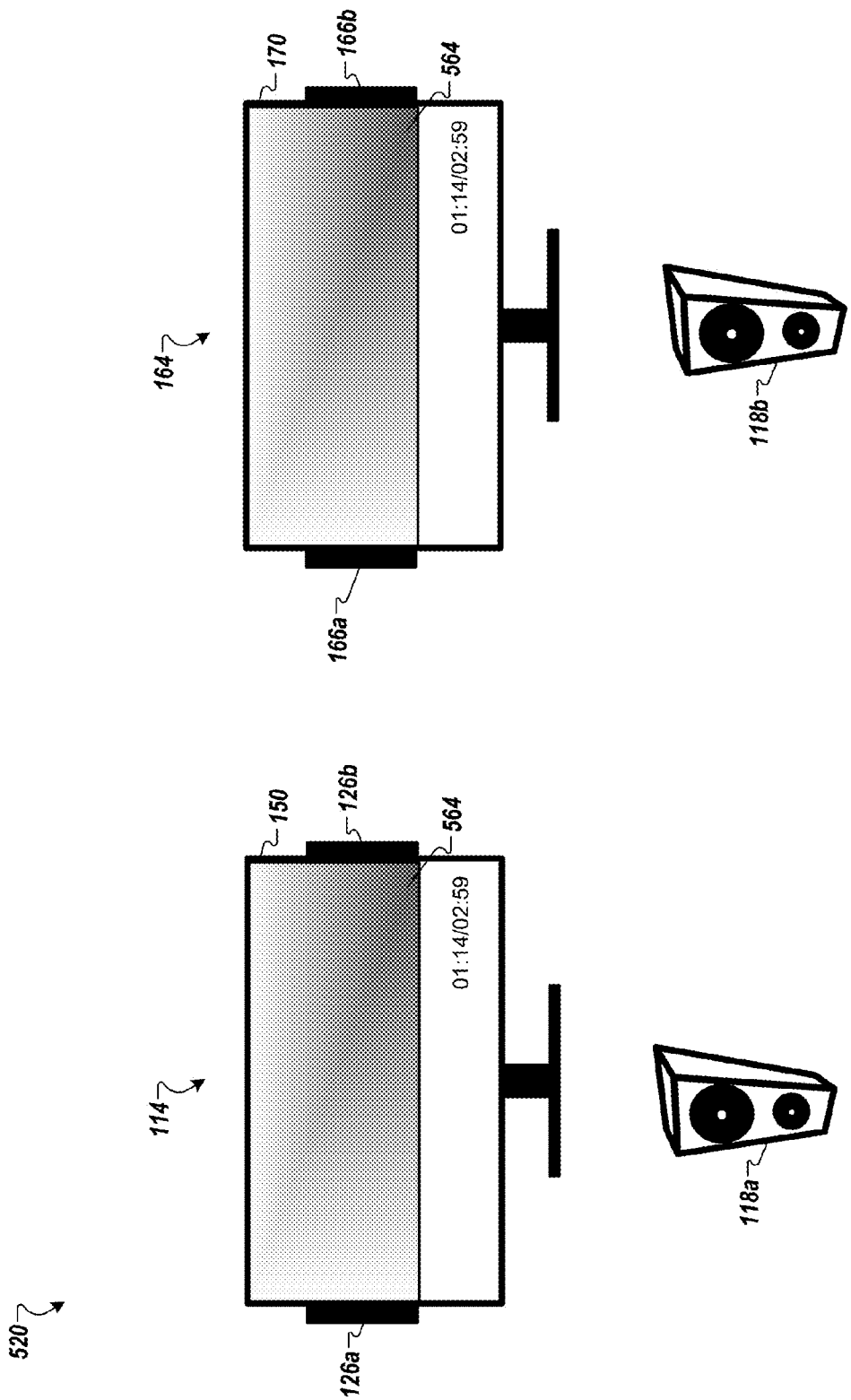

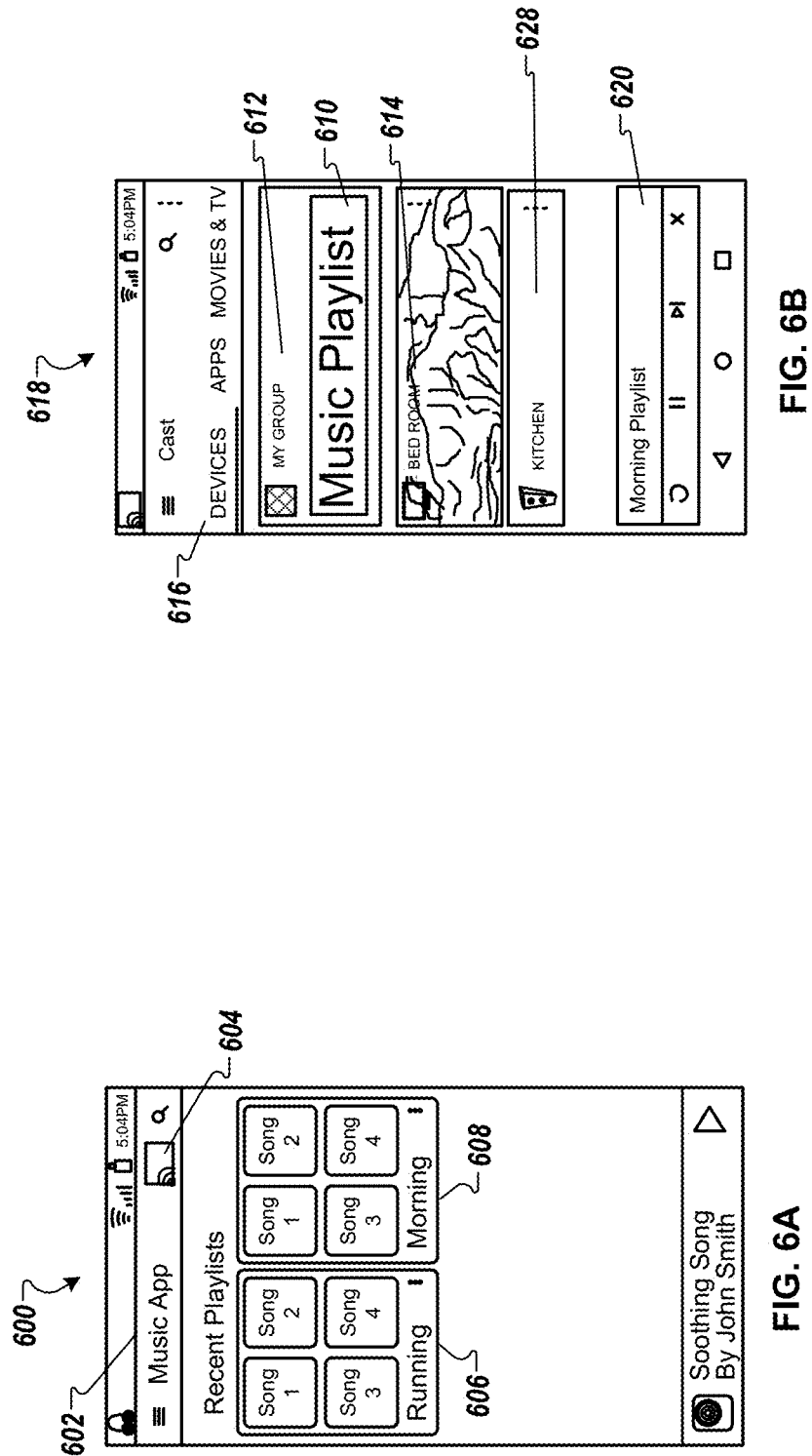

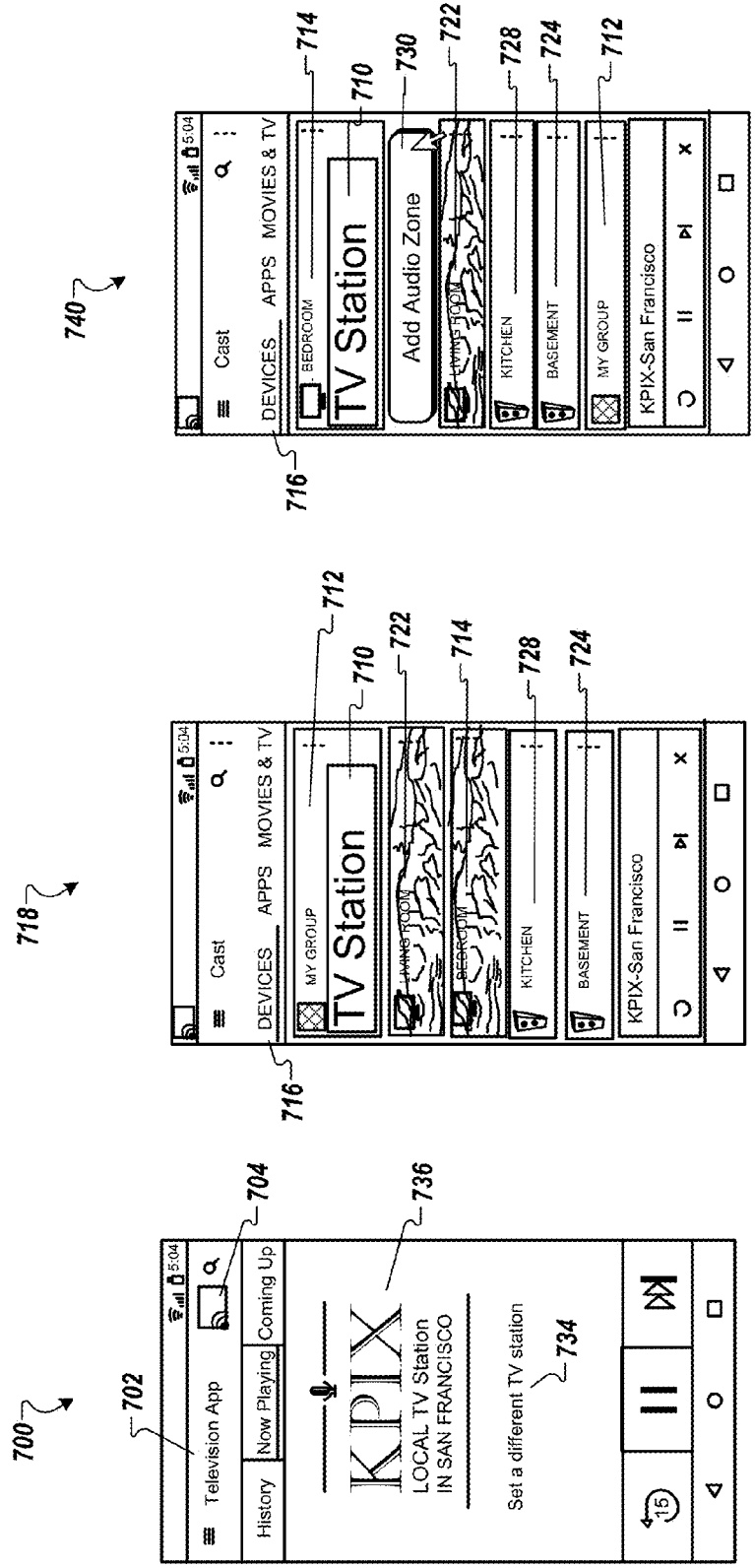

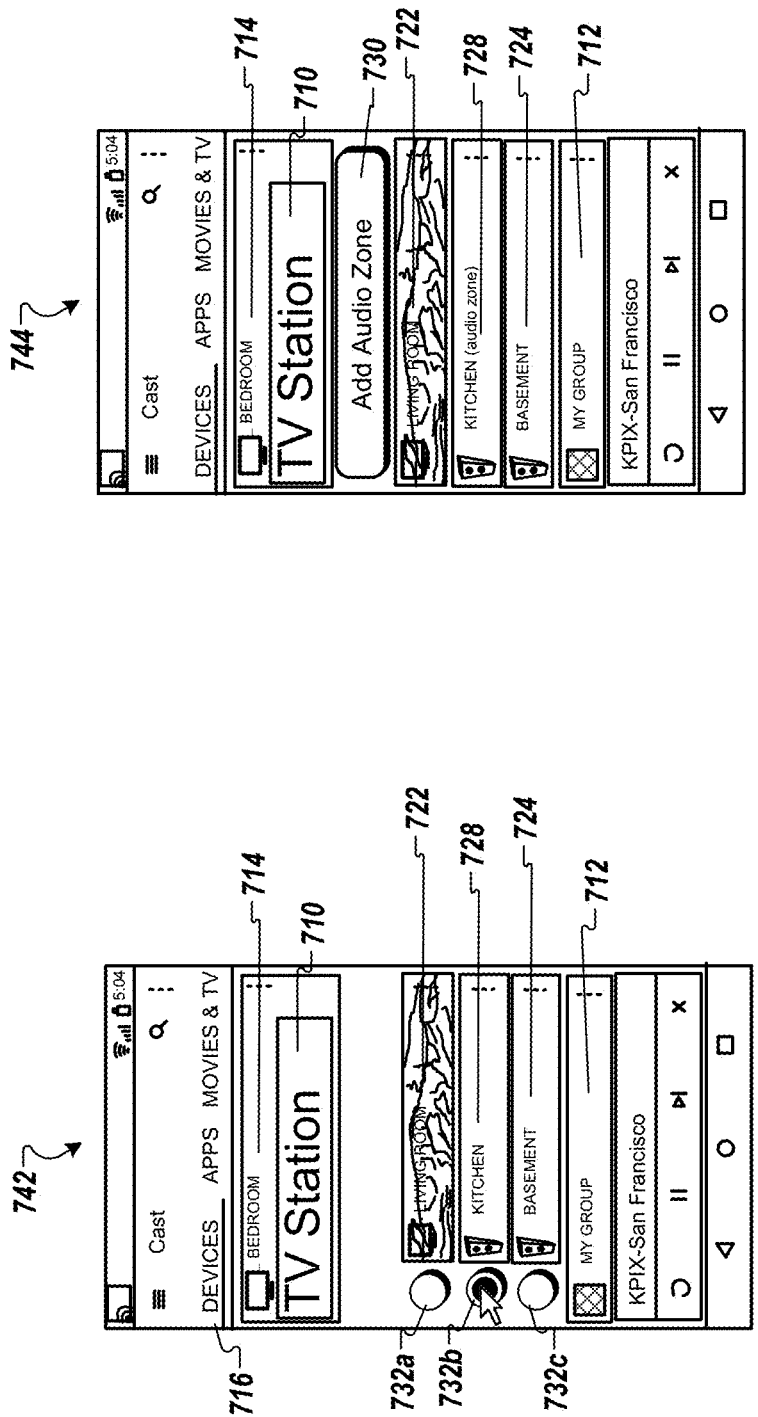

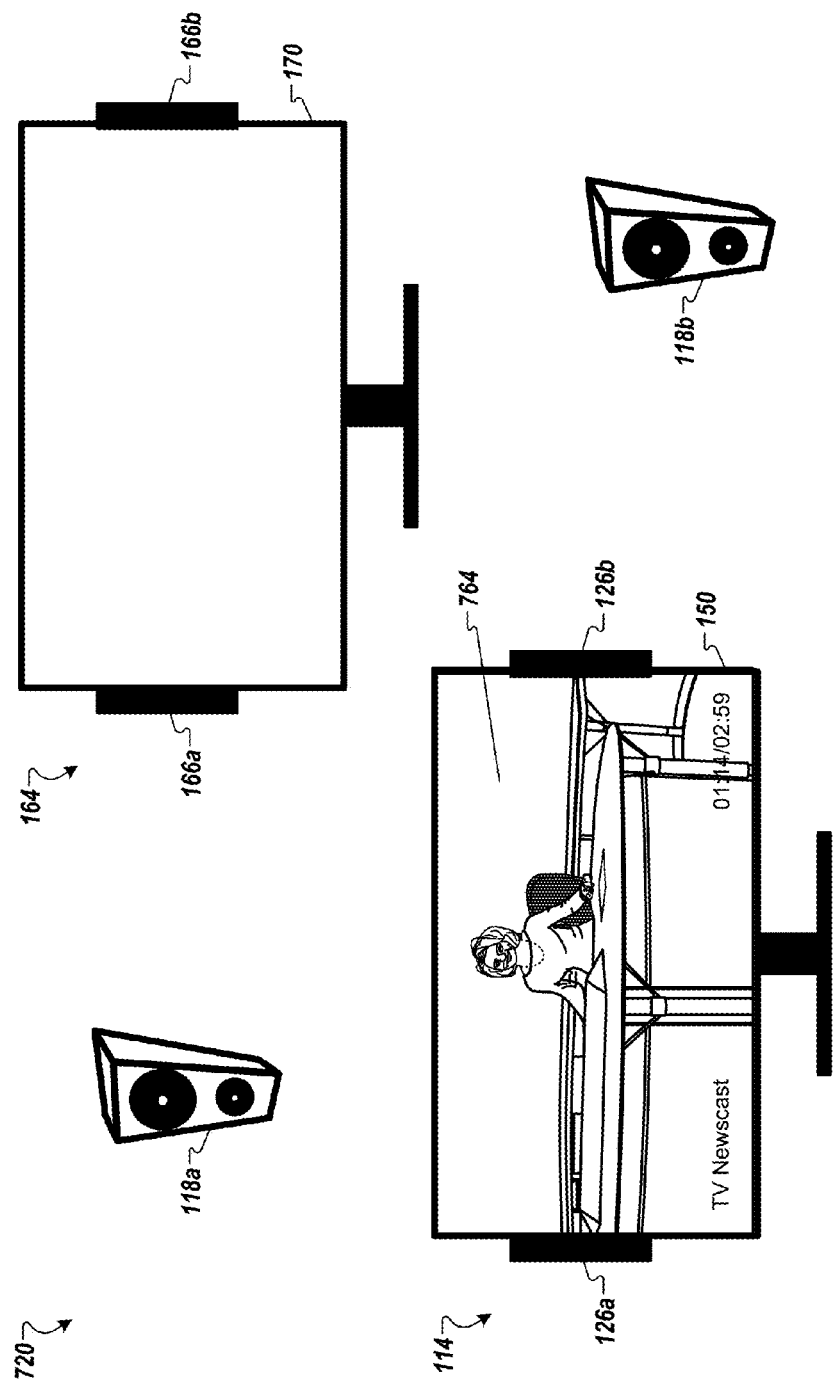

SYNCHRONIZING AUDIO CONTENT TO AUDIO AND VIDEO DEVICES

TECHNICAL FIELD

This description generally relates to computing devices, audio devices and video devices. The description, in particular, discusses synchronizing audio content and, in some cases, video content from a computing device to one or more audio and/or video devices.

BACKGROUND

A user may have multiple devices in their environment (e.g., a home, an office) that can play video and/or audio content. For example, a television (TV) can play both audio and video content. Speakers can play audio content. The environment of the user may include multiple TVs (a first TV in a family room, a second TV in a kitchen, a third TV in a bedroom). In addition, the environment of the user may include multiple speakers (e.g., a set of speakers between the family room and the kitchen, a set of speakers in a garage). All of these devices can play audio content and, in the case of the TVs, can play video content. In addition, a user may play streaming media (audio and/or video content) on a mobile computing device (e.g., a smartphone, a tablet computer, a laptop computer).

A user can have a variety of devices that can provide and play audio content (and in some cases video content) in a variety of locations throughout their environment. The user, therefore, may find helpful a mechanism that can allow them to select and control how and where they play selected video and/or audio content (e.g., streaming media).

SUMMARY

In one general aspect, a method can include receiving, by a computing device, a selection of a group of devices that receive content under control of the computing device. The computing device and each device included in the group of devices can be connected to a network. The method can include identifying, by the computing device, a first device and a second device included in the group of devices. The first device and the second device can be available to receive content from a server connected to the network. The server can be remote from the group of devices and the computing device. The first device and the second device can be available to receive the content under a control of the computing device. The method can include providing, by the computing device and to the first device, an indication that the content be provided to the first device by the server, and providing, by the computing device and to the second device, an indication that at least a portion of the content be provided to the second device. The at least a portion of the content can be provided by the server synchronously with the providing of the content to the first device.

Example implementations may include one or more of the following features. For instance, the content can be streaming audio content from a cast-enabled application executing on the computing device. The method can further include casting the content to the group of devices. The content can be streaming audio content. The first device can be a display device including a display area and at least one built-in speaker. The method can further include playing the content on the at least one built-in speaker. The content can be streaming audio content. The first device can be a first speaker and the second device can be a second speaker. The method can further include playing the content on the first speaker and the second speaker. The content can be audio content for playing on a speaker included in the computing device. The method can further include mirroring the content to the group of devices. The content can be streaming audio content from a browser-based application executing in an instance of a web browser application. The method can further include casting the content to the group of devices. The content can be streaming media content including audio and video portions. The first device can be a display device including a display area and at least one built-in speaker. The second device can be a speaker. The at least a portion of the content can be the audio portion of the streaming media content. The method can further include playing the content on the first device. The playing can include displaying the video portion of the content in the display area, playing the audio portion of the content on the at least one built-in speaker, and playing the at least a portion of the content on the second device. The content can be streaming media content including audio and video portions. The at least a portion of the content can be the audio portion of the streaming media content. Providing an indication that the content be provided to the first device can include providing an indication that the audio portion of the content be provided to the first device. The method can further include displaying the video portion of the content on a display device included in the computing device and playing the audio portion of the content on the first device. The playing of the audio portion of the content on the first device can be synchronized with the displaying of the video portion of the content on the display device. The method can further include playing of the audio portion of the content on the second device. The playing of the audio portion of the content on the second device can be synchronized with the displaying of the video portion of the content on the display device.

In another general aspect, a non-transitory, machine-readable medium has instructions stored thereon. The instructions, when executed by a processor, can cause a computing device to receive, by the computing device, a selection of a group of devices that receive content under control of the computing device. The computing device and each device included in the group of devices can be connected to a network. The instructions can further cause a computing device to identify, by the computing device, a first device and a second device included in the group of devices. The first device and the second device can be available to receive content from a server connected to the network. The server can be remote from the group of devices and the computing device. The first device and the second device can be available to receive the content under a control of the computing device. The instructions can further cause a computing device to provide, by the computing device and to the first device, an indication that the content be provided to the first device by the server. The instructions can further cause a computing device to provide, by the computing device and to the second device, an indication that at least a portion of the content be provided to the second device. The at least a portion of the content can be provided by the server synchronously with the providing of the content to the first device.

Example implementations may include one or more of the following features. For instance, the content can be streaming audio content from a cast-enabled application executing on the computing device. The instructions, when executed by the processor, can further cause the computing device to cast the content to the group of devices. The content can be streaming audio content. The first device can be a display device including a display area and at least one built-in speaker. The instructions, when executed by the processor, can further cause the computing device to play the content on the at least one built-in speaker. The content can be streaming audio content. The first device can be a first speaker and the second device can be a second speaker. The instructions, when executed by the processor, can further cause the computing device to play the content on the first speaker and the second speaker. The content can be audio content for playing on a speaker included in the computing device. The instructions, when executed by the processor, can further cause the computing device to mirror the content to the group of devices. The content can be streaming audio content from a browser-based application executing in an instance of a web browser application. The instructions, when executed by the processor, can further cause the computing device to cast the content to the group of devices. The content can be streaming media content including audio and video portions. The first device can be a display device including a display area and at least one built-in speaker. The second device can be a speaker. The at least a portion of the content can be the audio portion of the streaming media content. The instructions, when executed by the processor, can further cause the computing device to play the content on the first device. The playing of the content on the first device can include displaying the video portion of the content in the display area, and playing the audio portion of the content on the at least one built-in speaker. The instructions, when executed by the processor, can further cause the computing device to play the at least a portion of the content on the second device. The content can be streaming media content including audio and video portions. The at least a portion of the content can be the audio portion of the streaming media content. Providing an indication that the content be provided to the first device can include providing an indication that the audio portion of the content be provided to the first device. The instructions, when executed by the processor, can further cause the computing device to display the video portion of the content on a display device included in the computing device, and play the audio portion of the content on the first device. The playing of the audio portion of the content on the first device can be synchronized with the displaying of the video portion of the content on the display device. The instructions, when executed by the processor, can further cause the computing device to play the audio portion of the content on the second device. The playing of the audio portion of the content on the second device can be synchronized with the displaying of the video portion of the content on the display device.

In yet another general aspect, a system can include a network, a computing device connected to the network and configured to execute an application, and a first device external to the computing device and connected to the network. The first device can be included in a group of devices that receive content under control of the computing device. The system can include a second device external to the computing device and connected to the network. The second device can be included in the group of devices that receive content under the control of the computing device. The system can include a server connected to the network and configured to provide content to the first device and the second device under the control of the computing device. The computing device can provide an indication to the first device that the content be provided to the first device by the server. The computing device can provide an indication to the second device that the content be provided to the second device by the server. The application can synchronize the providing of the content to the first device and the second device.

Example implementations may include one or more of the following features. For instance, the application can be a cast-enabled application. The computing device can be further configured to execute a web browser application. The application can be a browser-based application executing in an instance of the web browser application. The content can be streaming media content including audio and video portions. The first device can be a display device including a display area. The second device can be a speaker. The application synchronizing the providing of the content to the first device and the second device can include synchronizing the playing of the audio portion of the content on the speaker with the playing of the video portion of the content in the display area of the display device.

The details of one or more implementations are set forth in the accompanying drawings and the description below. Other features will be apparent from the description and drawings, and from the claims.

BRIEF DESCRIPTION OF THE DRAWINGS

FIG. 5A is a diagram that shows an example user interface for a music radio application.

FIG. 5B is a first diagram that shows an example cast user interface that includes a my group indicator, a bedroom indicator, and a kitchen indicator included in a devices tab of the cast user interface.

FIG. 5C is a first diagram that shows content provided by a computing device to an available group of devices created by and selected by the user.

FIG. 6A is a diagram that shows an example user interface for a music application.

FIG. 6B is a second diagram that shows an example cast user interface that includes a my group indicator, a bedroom indicator, and a kitchen indicator included in a devices tab of the cast user interface.

FIG. 7A is a diagram that shows an example user interface for a television application.

FIG. 7B is a third diagram that shows an example cast user interface that includes a my group indicator, a bedroom indicator, and a kitchen indicator included in a devices tab of the cast user interface.

FIG. 7C is a diagram that shows an example cast user interface where a user has selected to provide content to a selected single device.

FIG. 7D is a diagram that shows an example cast user interface that can provide selection buttons that can allow a user to select devices associated with a living room indicator, a kitchen indicator, and a basement indictor.

FIG. 7E is a diagram that shows an example cast user interface that includes a notation that a device associated with a kitchen indicator has been selected as an audio zone.

FIG. 7F is a second diagram that shows content provided by a computing device to an available group of devices created by and selected by the user.

Like reference symbols in the various drawings indicate like elements.

DETAILED DESCRIPTION

A user can use technology included in a mobile computing device to provide content to a first electronic device and one or more additional electronic devices separate from but within a given range of communication with the mobile computing device. The electronic devices can be televisions (TVs) and/or audio speakers. The mobile computing device can include, but is not limited to, a laptop computer, a mobile phone, or a tablet. The content can be visual and/or audio content (e.g., streaming videos, streaming music, and streaming media). The mobile computing device can communicate with the first electronic device and the one or more additional electronic devices using a wireless communication network. For example, the mobile computing device, the first electronic device and the one or more additional electronic devices can be part of a wireless communication network (e.g., WiFi).

The technology can be electronics included in the mobile computing device that can interface and communicate with electronics included in the electronic devices. The mobile computing device can communicate with the electronic devices using the wireless network. For example, the mobile computing device, the first electronic device, and the one or more additional devices can communicate with one another over the WiFi network. In addition, the technology can include software and applications included on the mobile computing device that can provide (cast) the content to the first electronic device. The mobile device can provide (cast) the content to the first electronic device allowing the first electronic device to play the content while the mobile computing device can control the playing of the content. The control can include pausing, fast forwarding, and rewinding the content. The mobile computing device can control the volume of the audio. The mobile computing device can perform other functions and run other applications while providing (casting) the content to the first electronic device. For example, a user can use the mobile computing device to search the internet, place and receive phone calls, and send SMS messages. In addition, or in the alternative, the mobile computing device can enter a sleep mode or other reduced power mode while the provided (casted) content continues to play on the first electronic device.

A user may want to synchronize all or part of the content provided (casted) to the first electronic device to one or more of the additional electronic devices. By synchronizing the content, a user can move about their environment (e.g., home, office, business) and view and/or listen to the same content in different locations. The user can use their mobile device to perform other functions and run other applications while providing (casting) the synchronized content to the electronic devices.

Figure 1:
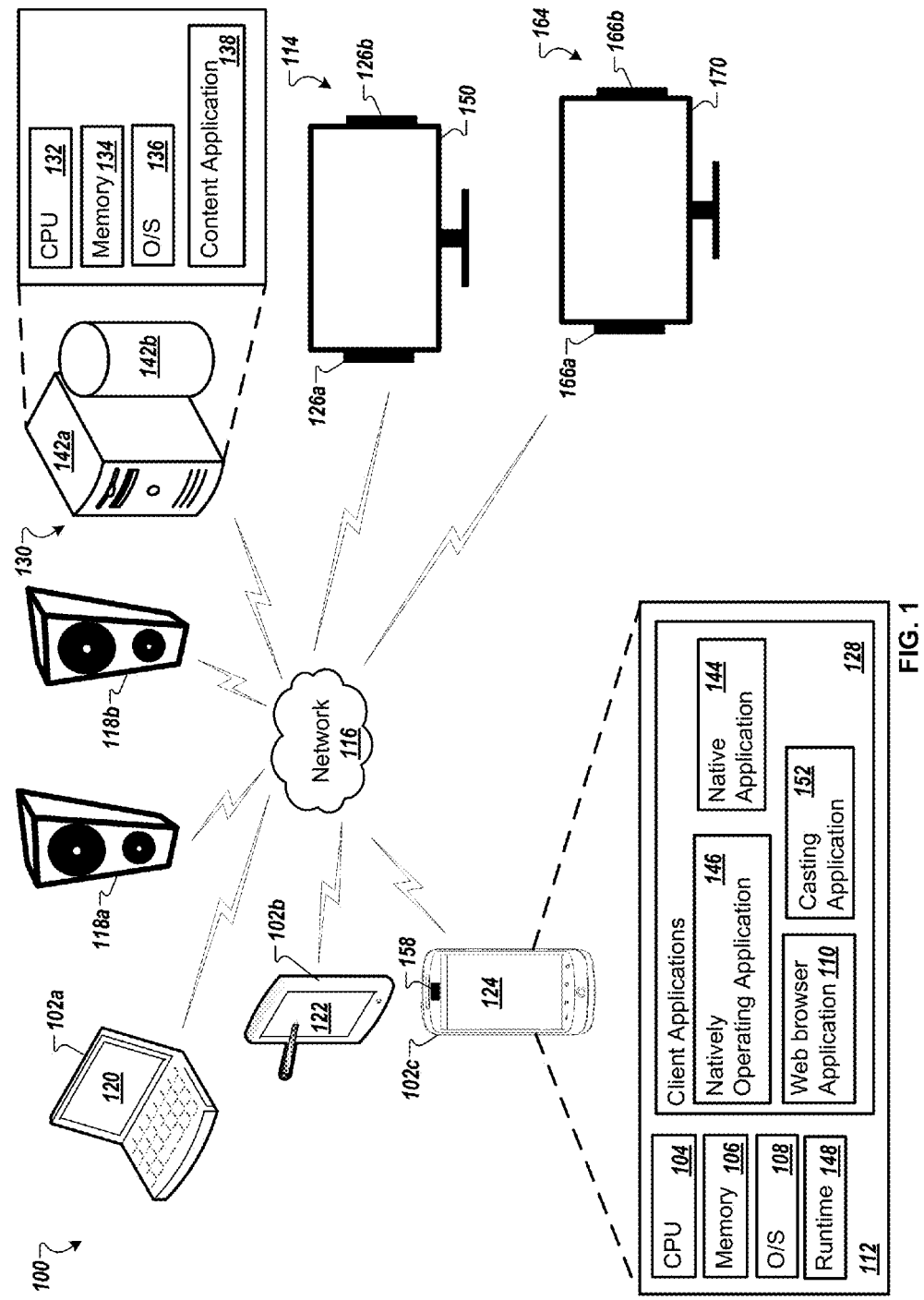
FIG. 1 is a block diagram of an example system that allows a user, using a computing device, to provide audio (and in some cases video) content to a group of devices.

FIG. 1 is a block diagram of an example system 100 that allows a user, using a computing device, to provide audio (and in some cases video) content to a group of devices. In addition, the computing device can control the providing of the content to the group of devices and can control the playing of the content on each device included in the group of devices.

The example system 100 can include a first display device 114 (e.g., a television (TV)), a second display device 164 (e.g., a television (TV)), and speakers 118a-b. The first display device 114 can include a display area 150 and built-in speakers 126a-b. The second display device 164 can include a display area 170 and built-in speakers 166a-b. Two built-in speakers 126a-b and 166a-b are shown in FIG. 1 for first display device 114 and the second display device 164, respectively, however, the first display device 114 and/or the second display device 164 can include less than two built-in speakers (e.g., a single built-in speaker) or more than two built-in speakers (e.g., three or more built-in speakers). In some implementations, the first display device 114 and/or the second display device 164 may interface with one or more external speakers in addition to the built-in speakers 126a-b and the built-in speakers 166a-b, respectively. In some implementations, a display device (e.g., the first display device 114 and/or the second display device 164) may not include built-in speakers and, for the playing of audio content, the display device may interface with one or more external speakers.

Though the system 100 includes a first display device 114 and a second display device 164, example systems can include a single (one) display device or more than two display devices (e.g., three or more display devices). Though FIG. 1 shows a speakers 118a-b, in some implementations, the system 100 can include one speaker or more than two speakers (e.g., three or more speakers).

In some situations, for example, the first display device 114, the second display device 164, and the speakers 118a-b can be collectively referred to as a group of output devices. Each device included in the group of output devices can be placed in a different location (e.g., a different room in a house, a different office within an office building). For example, the first display device 114 can be in a bedroom, the display device 164 can be in a family room, the speaker 118a can be in a kitchen, and the speaker 118b can be in a living room. The bedroom, the family room, the living room and the kitchen are located in a house. Though not necessarily located together, however, as shown in FIG. 1, the first display device 114, the second display device 164, and the speakers 118a-b are each interfaced to/connected to the network 116.

The example system 100 can include a plurality of computing devices 102a-c (e.g., a laptop computer, a tablet computer, and a smart phone, respectively). A user can use one of the computing devices 102a-c to control providing audio and/or video content to the group of output devices. An example computing device 102c (e.g., a smart phone) can include a computing device system 112. The computing device system 112 can include one or more processors (e.g., a client central processing unit (CPU) 104) and one or more memory devices (e.g., a client memory 106)). The computing device 102c can execute a client operating system (O/S) 108 and one or more client applications 128 (e.g., a web browser application 110, a natively operating application 146, and a native application 144) that can display a user interface (UI) on a display device 124 included in the computing device 102c.

The computing device 102c can include a microphone/speaker 158. Though a single microphone/speaker is shown in FIG. 1, in some implementations, the computing device 102c can include more than one microphone/speaker (e.g., two or more microphone/speakers, a single microphone/speaker and one or more additional speakers). Though FIG. 1 shows the computing device system 112 as included in the computing device 102c, a computing device system similar to the computing device system 112 can be included in each of the computing devices 102a-b, and can perform operations and functions in a manner similar to the computing device system 112.

The system 100 can include a computer system 130 that can include one or more computing devices (e.g., a server 142a) and one or more computer-readable storage devices (e.g., a database 142b). The server 142a can include one or more processors (e.g., a server CPU 132), and one or more memory devices (e.g., a server memory 134). The computing devices 102a-c can communicate with the computer system 130 (and the computer system 130 can communicate with the computing devices 102a-c) using a network 116. The server 142a can execute a server O/S 136.

In some cases, the server 142a can be a content server and the database 142b can be a content repository. The server 142a can execute a content application 138 that can provide content to the computing devices 102a-c. The content application 138 can provide content to the first display device 114, the second display device 164, and/or the speakers 118a-b under the initiation, control, and direction of one of the computing devices 102a-c.

In some implementations, the computing devices 102a-c can be laptop or desktop computers, smartphones, personal digital assistants, portable media players, tablet computers, or other appropriate computing devices that can communicate, using the network 116, with other computing devices or computer systems. In some implementations, the computing devices 102a-c can perform client-side operations, as discussed in further detail herein. Implementations and functions of the system 100 described herein with reference to computing device 102c, may also be applied to computing device 102b and computing device 102a and other computing devices not shown in FIG. 1 that may also be included in the system 100. The computing device 102b includes a display device 122. The computing device 102a includes a display device 120. The display device 120 and the display device 122 may function in a similar manner as the display device 124. Though not shown in FIG. 1, the computing device 102a and the computing device 102b may include one or more speakers that can function in a similar manner as the microphone/speaker 158.

In some implementations, the computer system 130 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server, a web crawler server, and a marketplace server.

In some implementations, the network 116 can be a public communications network (e.g., the Internet, cellular data network, dialup modems over a telephone network) or a private communications network (e.g., private LAN, leased lines). In some implementations, the computing devices 102a-c can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The web browser application 110 can execute, interpret, and/or display a browser-based application. A browser-based application can run inside a tab or instance of the web browser application using a dedicated user interface, and can provide functionality and an experience that is more rich and interactive than a standalone website but that is less cumbersome and monolithic than the native application 144. Examples of browser-based applications can include, but are not limited to, games, photo editors, and video players that can run inside the web browser application 110. The browser-based application can provide a dedicated UI for display on the display device 124.

Browser-based applications can be "hosted applications" or "packaged applications." Hosted applications may include at least a portion of a web site that itself includes web pages, in addition to some metadata that may be especially pertinent to the browser-based application or to the user of the browser-based application to allow the browser-based application to perform some particular functionality for the user. Packaged applications can be browser-based applications whose code is bundled, so that the user can download all of the content of the browser-based application for execution by the browser. A packaged browser-based application may not need to have network access to perform its functionality for the user, and may be executed successfully by the browser locally on the computing device without access to a network. Packaged browser-based applications have the option of using Extension APIs, allowing packaged applications to change the way the browser behaves or looks.

In some implementations, the computing device 102c can run, or cause the operating system 108 to execute, the web browser application 110. The web browser application 110 can then provide, in a web browser UI, a plurality of panes or tabs. In a graphical user interface (GUI) used in the computing device 102c, the web browser UI can be a two-dimensional object arranged on a plane of the GUI known as a desktop. The web browser UI can include other graphical objects (e.g., a menu-bar, toolbars, controls, icons). The web browser UI can display the graphical objects on the display device 124. A user of the computing device 102c can interact with the graphical objects to provide input to, or otherwise control the operation of, the web browser application 110.

In some implementations, a web browser application (e.g., the web browser application 110) can provide or "cast" a first tab or page of the web browser application to a group of output devices (e.g., the first display device 114, the second display device 164, and the speakers 118a-b). The group of output devices are external from the computing device (e.g., the computing device 102c) that is executing the web browser application. In some implementations, the web browser application can provide a user interface for initiating and controlling the casting of the first tab. In addition, for example, a Web Real-Time Communication (WebRTC) application program interface (API) can be used for browser-based real-time communications.

The natively operating application 146 can be an application that is coded using only web technology (defined here as code that can be implemented directly by a web browser application), such as JavaScript, ActionScript, HTML, or CSS. For example, the computing device 102c can download and install the natively operating application 146 from a marketplace server using a web browser application (e.g., web browser application 110). The natively operating application 146 can operate using a runtime 148. For example, the CPU 104 or by the O/S 108 can execute or run the natively operating application 146 using the runtime 148. Because the natively operating application 146 is coded using web technologies, no compilation step is required.

Native applications (e.g., the native application 144) can include machine executable code and can be executed directly by the O/S 108 of the client device, whereas, a browser-based application may be incapable of execution without the aid of the web browser application 110.

The client applications 128 can present, provide, cast, or capture and mirror content (e.g., streaming media, streaming audio and/or streaming video) to a group of external output devices (e.g., the first display device 114, the second display device 164, and the speakers 118a-b). In some implementations, the client applications 128 can present, provide, cast, or capture and mirror streaming audio content to the group of output devices. In these implementations, the first display device 114 can play the audio content on the built-in speakers 126a-b, the second display device 164 can play the audio content on the built-in speakers 166a-b, and the speakers 118a-b can play the audio content.

In some implementations, when streaming audio and video content to the group of output devices, the first display device 114 can display the video (image) content in the display area 150 and can play the audio content on the built-in speakers 126a-b, the second display device 164 can display the video (image) content in the display area 170 and can play the audio content on the built-in speakers 166a-b, and the speakers 118a-b can play the audio content.

In some implementations, either the first display device 114 or the second display device 164 can display the video (image) content in the display area 150 and the display area 170, respectively. In these implementations, both the first display device 114 and the second display device 164 can play the audio content on the built-in speakers 126a-b and 166a-b, respectively. The speakers 118a-b can also play the audio content.

In some implementations, the client applications 128 can present, provide, cast, or capture and mirror streaming audio content to the group of output devices while displaying (in a synchronized manner) video (image) content on the display device 124 included in the computing device 102c. In these implementations, the first display device 114 can play the audio content on the built-in speakers 126a-b, the second display device 164 can play the audio content on the built-in speakers 166a-b, and the speakers 118a-b can play the audio content. In some implementations, the client applications 128 can present, provide, cast, or capture and mirror streaming audio content to a single output device (e.g., the speaker 118a) while displaying (in a synchronized manner) video (image) content on the display device 124 included in the computing device 102c. In some implementations, the client applications 128 can present, provide, cast, or capture and mirror streaming video (image) content to a single output device (e.g., the display area 150 of the first display device 114) while playing (in a synchronized manner) audio content on the microphone/speaker 158 included in the computing device 102c.

A casting application 152 can discover or identify one or more cast-enabled devices that the client applications 128 included in the computing device 102c can present, provide, cast, or capture and mirror content (e.g., streaming media, streaming audio and/or streaming video). For example, the casting application 152 can identify the first display device 114, the second display device 164, and the speakers 118a-b as cast-enabled devices. A user can define a group of external output devices that can receive content under the control of a computing device. For example, the casting application 152 can provide a graphical user interface (GUI) for display on the display device 124 of the computing device 102c that enables a user to select available output devices for placement in a group of output devices. The user can then select the group of output devices for receiving content.

The natively operating application 146 and the native application 144 can present, provide, cast, or capture and mirror streaming media (e.g., audio and/or video(image) content) to the group of external output devices. The client applications 128 can include a UI that can be presented on the display device 124 of the computing device 102c. A user can interact with the UI and provide inputs and selections for controlling the providing or casting of the streaming media content to the group of external output devices.

In some implementations, the computing device 102c can display content in a tab or page of a web browser application. The web browser application can provide or "cast" the tab or page to a group of cast-enabled devices (e.g., the first display device 114, the second display device 164, and the speakers 118a-b). A cast-enabled device can communicate with a network (e.g., the network 116) using a high-speed wireless protocol such as WiFi, Bluetooth, or Bluetooth LE. For example, the web browser application can provide a user interface for initiating and controlling the casting of the tab. The user of the computing device 102c can provide or "cast" the tab to the group of external output devices by selecting an icon included on the user interface for the web browser application that initiates the casting of the tab. The content can be provided from the server 142a by the content application 138 to the group of external output devices by way of the network 116 by using a high-speed wireless protocol (e.g., WiFi, Bluetooth, Bluetooth LE). The computing device 102c communicates with the server 142a by way of the network 116 by using a high-speed wireless protocol (e.g., WiFi, Bluetooth, Bluetooth LE) to control the content provided to the group of external output devices.

The client applications 128 can be cast-enabled applications that can control the providing of content to cast-enabled devices (e.g., the first display device 114, the second display device 164, and the speakers 118a-b). For example, a cast-enabled application can provide a user interface for initiating and controlling the casting of the content from the application to the group of external cast-enabled devices. The user of the computing device 102c can provide or "cast" the content to the group of external output devices by selecting an icon included on the user interface for the cast-enabled application that initiates the casting.

The computing device 102c can act as a controller for content provided or casted to a group of cast-enabled devices (e.g., the first display device 114, the second display device 164, and the speakers 118a-b). For example, the natively operating application 146 and the native application 144 can be cast-enabled applications. For example, the content can be a song and a user can touch (contact, tap) icons provided in a user interface of the application to control the playing of the song. For example, the content can be audio content (e.g., streaming audio from an online radio station) and a user can touch (contact, tap) icons provided in a user interface of the application to control the playing of the audio content.

Figure 2:
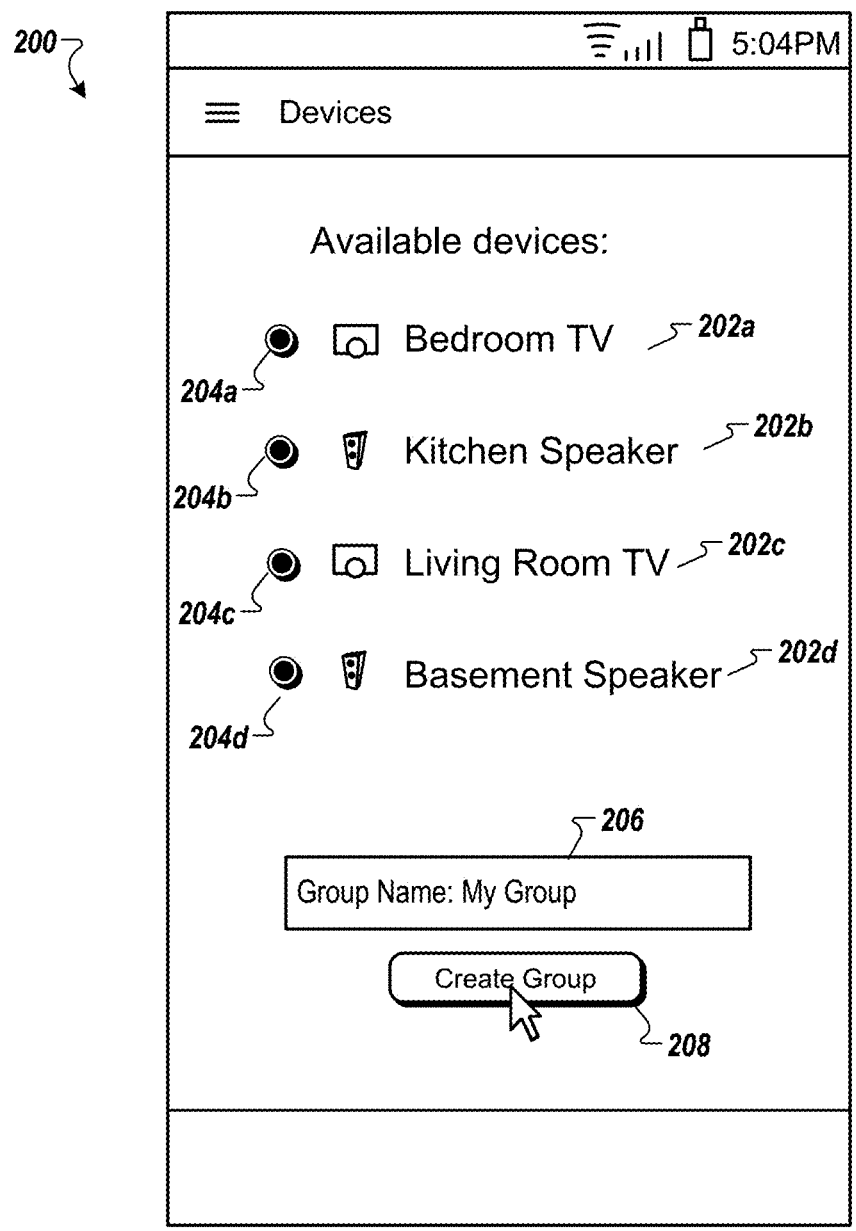
FIG. 2 is a diagram that shows an example user interface for selecting one or more cast-enabled devices for placement in a group of cast-enabled devices.

FIG. 2 is a diagram that shows an example user interface 200 for selecting one or more cast-enabled devices for placement in a group of cast-enabled devices. Referring to FIG. 1, a computing device (e.g., the computing device 102c) can display the user interface 200 on a display device (e.g., the display device 124). The example user interface 200 can be for a casting application (e.g., the casting application 152). The user interface 200 can provide a list of available devices 202a-d (e.g., one or more cast-enabled devices) that the client applications 128 included in the computing device 102c can present, provide, cast, or capture and mirror content (e.g., streaming media, streaming audio and/or streaming video).

For example, the casting application 152 can identify the first display device 114 (e.g., Bedroom TV 202a), the second display device 164 (e.g., Living Room TV 202c), and the speakers 118a-b (e.g., Kitchen Speaker 202b and Basement Speaker 202d, respectively) as cast-enabled devices. For example, the available device 202a-d can be devices that are on the same network as the computing device 102c. A user can select one or more of the available devices 202a-d using respective device selection buttons 204a-d. The user can enter a name (e.g., My Group) for the selected group of devices in the group name input box 206. The user can select the create group button 208 to create the group of selected devices.

In some implementations, a device can be included in more than one group of devices. In some implementations, if a device that is a member of a group of devices is no longer available (e.g., the device is off-line), the group can still be discoverable and a computing device can still provide (present, cast, or capture and mirror) content the discoverable or identified devices that remain in the group of devices.

Referring to FIG. 2, in some implementations the example user interface 200 can include an indication of the status (e.g., discovered/identified, off-line) of the available devices 202a-d when a user is creating a group of devices.

Though the user has created a group of cast-enabled devices, in some cases, a user can choose to have the computing device 102c present, provide, cast, or capture and mirror content to the group of devices or, alternatively, to one or more individually selected available devices 202a-d.

Figure 3:
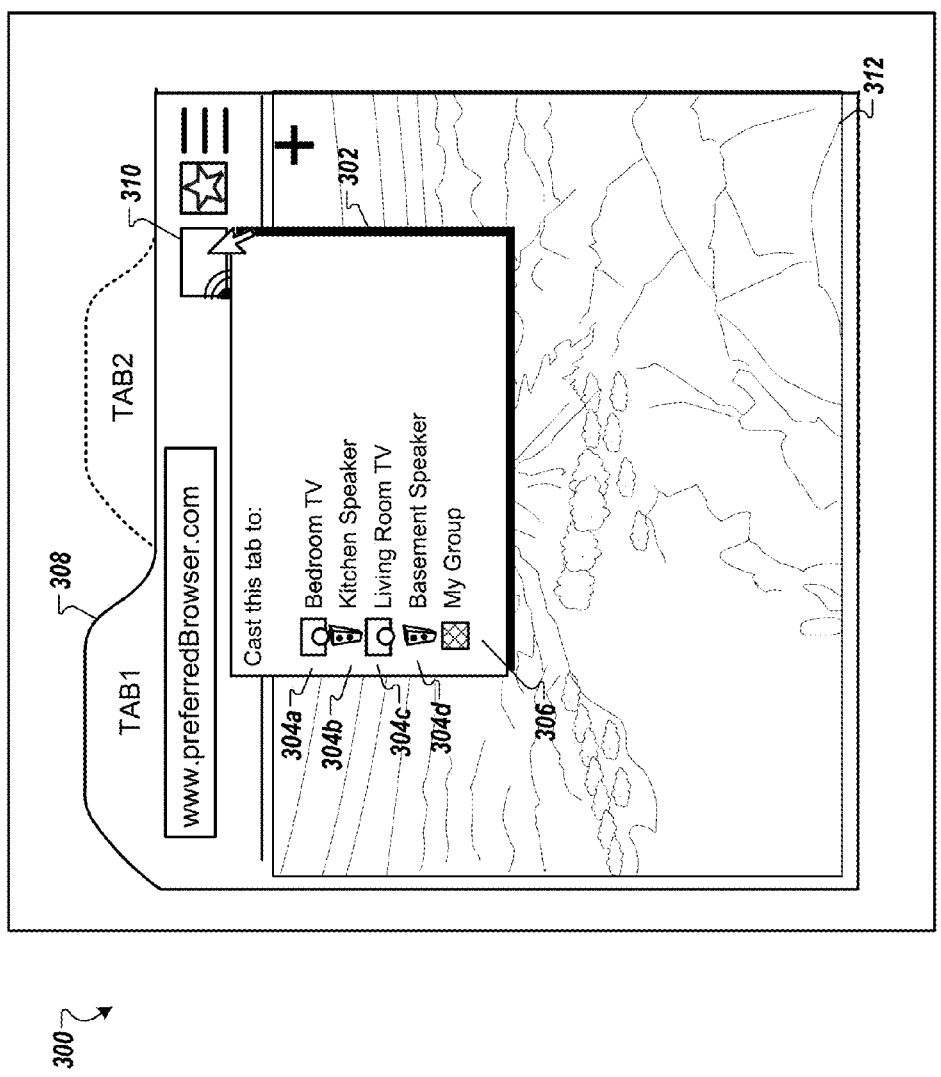
FIG. 3 is a diagram of a user interface that shows an example of a pull-down menu that can display a list of available devices that a computing device can present, provide, cast, or capture and mirror content to using a browser-based application.

FIG. 3 is a diagram of a user interface 300 that shows an example of a pull-down menu 302 that can display a list of available devices 304a-d (e.g., one or more cast-enabled devices) that a computing device (e.g., the computing device 102c) can present, provide, cast, or capture and mirror content to using a browser-based application. For example, referring to FIG. 1, the computing device 102c can display the user interface 300 on the display device 124. The pull-down menu 302 can include one or more available groups of devices (e.g., group 306 (My Group)) that a user may have created (e.g., as described with reference to FIG. 2). The browser-based application can be an application running in a tab 308 of a web browser application (e.g., the web browser application 110 in FIG. 1). A user can select a casting icon 310 in order to display the pull-down menu 302.

For example, a user can be running a browser-based application that displays an image 312 in the tab 308 of a web browser application (e.g., the web browser application 110). The browser-based application may also provide audio content. The user can select an available device from the available devices 304a-d that the computing device 102c can present, provide, cast, or capture and mirror information and data (e.g., streaming video and/or audio content) included in the tab 308 to the selected available device. The user can select the group 306 of devices that the computing device 102c can present, provide, cast, or capture and mirror information and data (e.g., streaming video and/or audio content) included in the tab 308 to each device included in the group 306 of devices. In some implementations, the content provided to each device included in the group of devices can be based on the type of device. For example, speakers can receive audio content. Display devices can receive image (video) content. In some implementations, the content provided to each device included in the group of devices can be based on a selected way of providing content to a device.

Figure 4:
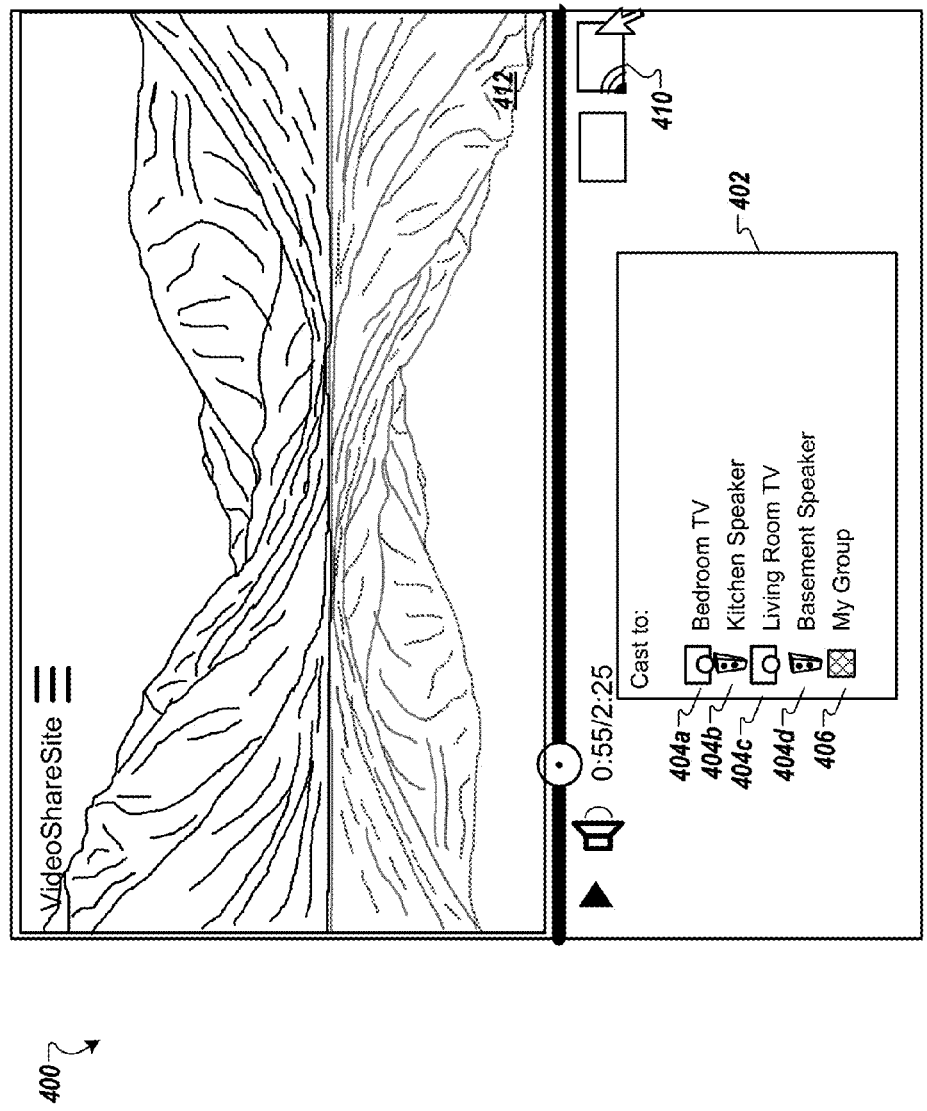
FIG. 4 is a diagram of a user interface that shows an example of a pop-up menu that can display a list of available devices that a computing device can present, provide, cast, or capture and mirror content to using a cast-enabled application.

FIG. 4 is a diagram of a user interface 400 that shows an example of a pop-up menu 402 that can display a list of available devices 404a-d (e.g., one or more cast-enabled devices) that a computing device (e.g., the computing device 102c) can present, provide, cast, or capture and mirror content to using a cast-enabled application.

For example, referring to FIG. 1, the computing device 102c can display the user interface 400 on the display device 124. The pop-up menu 402 can include one or more available groups of devices (e.g., group 406 (My Group)) that a user may have created (e.g., as described with reference to FIG. 2). The cast-enabled application can be a native application (e.g., the native application 144). The cast-enabled application can be a natively operating application 146. A user can select a casting icon 410 in order to display the pop-up menu 402.

For example, a user can be running a cast-enabled application that displays an image 412. The cast-enabled application may also provide audio content. The image 412 and audio content can be streaming media (e.g., a movie, a video). The user can select an available device from the available devices 404a-d that the computing device 102c can present, provide, cast, or capture and mirror information and data (e.g., streaming media, streaming video and/or audio content). The user can select the group 406 of devices that the computing device 102c can present, provide, cast, or capture and mirror information and data (e.g., streaming video and/or audio content) to each device included in the group 406 of devices. In some implementations, the content provided to each device included in the group of devices can be based on the type of device. For example, speakers can receive audio content. Display devices can receive image (video) content. The content can be synchronized, for example, such that if the user is watching a move, the image content for the movie can be provided to at least one display device included in the group of devices while the audio content can be provided to at least one speaker included in the group of devices. In some implementations, the content provided to each device included in the group of devices can be based on a selected way of providing content to a device.

FIGS. 5A-C are diagrams that show providing (presenting, casting, or capturing and mirroring) of selected content (e.g., music radio) by a computing device (e.g., the computing device 102c) to an available group of devices (e.g., group 406 (My Group)). As described with reference to FIG. 1, the available group of devices can include the first display device 114, the second display device 164, and the speakers 118a-b.

FIG. 5A is a diagram that shows an example user interface 500 for a cast-enabled application (e.g., a music radio application 502). A display device (e.g., the display device 124) of a computing device (e.g., the computing device 102c) can display the user interface 500. For example, a user can launch the music radio application 502 included on the computing device 102c.

The user interface 500 includes a cast icon 504. A user can select the cast icon 504 in order to provide (present, cast, or capture and mirror) content from the music radio application 502 to an identified external device or to a group of devices. The user interface includes a current station indication 532 and a set station selection 534. For example, the user can select the set station selection 534 to select a different (change) the current radio station.

FIG. 5B is a diagram that shows an example cast user interface 518 that includes a my group indicator 512, a bedroom indicator 514, and a kitchen indicator 528 included in a devices tab 516 of the cast user interface 518. A display device (e.g., the display device 124) of a computing device (e.g., the computing device 102c) can display the cast user interface 518.

In some implementations, a display device (e.g., the display device 124) of a computing device (e.g., the computing device 102c) can display the cast user interface 518 in response to a user selecting the cast icon 504. A cast identifier 510 can provide an indication of the content (e.g., music radio) being provided (presented, cast, or captured and mirrored) to an available group of devices 520 (e.g., My Group) as shown in FIG. 5C. As described with reference to FIG. 2, a user can create the group of devices (e.g., My Group) by selecting one or more devices identified as available to the computing device 102c for providing (presenting, casting, or capturing and mirroring) content.

In some implementations, a user can navigate to a settings interface included on a computing device. The settings interface can include a selection for setting up casting using the computing device and cast-enabled external devices that are near, on the same wired or wireless network, or in communication with the computing device. The cast user interface 518 can include a devices tab 516 (a devices selection). The user can select the devices tab 516 and be provided with the example cast user interface 518. In this example, the cast identifier 510 provides an indication of the content (e.g., music radio) being provided (presented, cast, or captured and mirrored) to a group of devices associated with the name "My Group" (e.g., the available group of devices 520 as shown in FIG. 5C). In some implementations, the cast identifier 510 can allow a user to select, enter, or input an identifier (e.g., a name) for the content they would like to provide (present, cast, or capture and mirror) to the available group of devices 520 as shown in FIG. 5C.

FIG. 5C is a diagram that shows content provided (presented, casted, or captured and mirrored) by a computing device (e.g., the computing device 102c) to an available group of devices 520 created by and selected by the user (e.g., My Group). The available group of devices 520 includes two display devices (e.g., the external first display device 114 and the external second display device 164) and two speakers (e.g., speakers 118a-b). The content includes visual content 564 (e.g., a single grayscale image) that is provided (presented, casted, or captured and mirrored) by a computing device (e.g., the computing device 102c) to the external first display device 114 for presenting in the display area 150. The content includes visual content 564 (e.g., a single grayscale image) that is provided (presented, casted, or captured and mirrored) by a computing device (e.g., the computing device 102c) to the external second display device 164 for presenting in the display area 170.

The content includes audio content that is provided (presented, casted, or captured and mirrored) by a computing device (e.g., the computing device 102c) to the external first display device 114 for playing on the built-in speakers 126a-b. The audio content is also provided (presented, casted, or captured and mirrored) by a computing device (e.g., the computing device 102c) to the external second display device 164 for playing on the built-in speakers 166a-b. The audio content is also provided (presented, casted, or captured and mirrored) by a computing device (e.g., the computing device 102c) to the speakers 118a-b.

The example shown in FIGS. 5A-C can be referred to as group audio casting. Group audio casting is the casting of audio content by a computing device executing a cast-enabled application to an available group of cast-enabled devices.

As described with reference to FIGS. 1 and 2, each device included in the available group of devices 520 can be located in different rooms or areas of a current location of a user. For example, the user location can be a house and each of the devices included in the available group of devices 520 can be located in a different room in the house. The external first display device 114 can be a television located in a bedroom, the external second display device 164 can be a television located in a living room, the speaker 118a can be located in a kitchen, and the speaker 118b can be located in a basement. Since the content is provided (presented, casted, or captured and mirrored) by a computing device (e.g., the computing device 102c) to each of the devices included in the available group of devices 520, a user can move about the house while continuing to listen to and/or view selected content.

In some implementations, for example, the speakers 118a-b may be located in the same room. In these cases, a computing device can provide (present, cast, or capture and mirror) audio content in stereo to the pair of speakers 118a-b, effectively providing a portion of the audio content to the speaker 118a (e.g., a right speaker) and a portion of the audio content to the speaker 118b (e.g., a left speaker). In some implementations, a speaker (e.g., the speaker 118a) can be included in and implemented for a surround sound multichannel audio system. In these implementation, a computing device can provide (present, cast, or capture and mirror) audio content in a form compatible with a surround sound multichannel audio system.

Referring to FIG. 4, a user may be viewing and listening to streaming media content (e.g., a movie, a video) that includes video content (e.g., the image 412) and audio content provided by the cast-enabled application on a computing device. For example, referring to FIG. 1, the user can view the video content on a display device 124 included in a computing device 102c while listening to the audio content as played on the microphone/speaker 158. In some implementations, the user may want to continue to view the video portion of the content on the display device 124 included in the computing device 102c while having the cast-enabled application provide the audio portion of the content synchronously to each device included in an available group of devices (e.g., group 406 (My Group)). For example, referring to FIG. 5C, the case-enabled application can provide the audio portion of the streaming media content to the available group of devices 520 that includes the built-in speakers 126a-b included in the first display device 114, the built-in speakers 166a-b included in the second display device 164, and the speakers 118a-b.

This operating mode can be referred to as a group audio stripping. Group audio stripping synchronizes the playback of video content on a display device of a computing device of a user with the playing of the audio content on one or more external cast-enabled devices. In some implementations, the user may want to synchronize the playback of video content on a display device of a computing device of a user with the playing of the audio content on a single external cast-enabled device. These implementations can be referred to as audio stripping.

Referring again to FIG. 4, a user may be viewing and listening to streaming media content (e.g., a movie, a video) that includes video content (e.g., the image 412) and audio content provided by the cast-enabled application on a computing device. For example, referring to FIG. 1, the user can view the video content on a display device 124 included in a computing device 102c while listening to the audio content as played on the microphone/speaker 158. In some implementations, the user may want to continue to listen to the audio portion of the content on the microphone/speaker 158 included in the computing device 102c while having the cast-enabled application provide the video (image) portion of the content synchronously to a device included in an available group of devices (e.g., group 406 (My Group)). For example, referring to FIG. 5C, the case-enabled application can provide the video portion of the streaming media content to the display area 150 included in the external first display device 114.

This operating mode can be referred to as private listening. Private listening synchronizes the playing of the audio content on a speaker included in a computing device of a user (e.g., the microphone/speaker 158 included in the computing device 102c) with the playback of video content in a display area of an external cast-enabled computing device the display area 150 included in the external first display device 114).

In some cases, there may be unique challenges when implementing audio stripping and private listening that can be dependent on the computing device that is providing/sending the content in order to maintain synchronization of the audio and video content.

FIGS. 6A-B are diagrams that show providing (presenting, casting, or capturing and mirroring) of selected content (e.g., a music playlist) by a computing device (e.g., the computing device 102c) to an available group of devices (e.g., group 306 (My Group)). As described with reference to FIG. 1, the available group of devices can include the first display device 114, the second display device 164, and the speakers 118a-b.

FIG. 6A is a diagram that shows an example user interface 600 for a cast-enabled application (e.g., a music application 602). Referring to FIG. 1, a display device (e.g., the display device 124) of a computing device (e.g., the computing device 102c) can display the user interface 600. For example, a user can launch the music application 602 included on the computing device 102c. The music application 602 can play music (e.g., songs, streaming audio content) included in a playlist (e.g., a running playlist 606, a morning playlist 608) on one or more speakers included on the computing device (e.g., microphone/speaker 158 included in the computing device 102c).

The user interface 600 includes a cast icon 604. A user can select the cast icon 604 in order to capture and mirror audio content from the music application 602 to an identified external device or to a group of devices.

FIG. 6B is a diagram that shows an example cast user interface 618 that includes a my group indicator 612, a bedroom indicator 614, and a kitchen indicator 628 included in a devices tab 616 of the cast user interface 618. A display device (e.g., the display device 124) of a computing device (e.g., the computing device 102c) can display the cast user interface 618.

In some implementations, a display device (e.g., the display device 124) of a computing device (e.g., the computing device 102c) can display the cast user interface 618 in response to a user selecting the cast icon 604. A cast identifier 610 can provide an indication of the audio content (e.g., a music playlist) being captured and mirrored from the music application 602 to an available group of devices 520 (e.g., My Group) as shown, for example, in FIG. 5C. A playlist indicator 620 provides an indication of the playlist (e.g., the morning playlist 608) selected by the user for the music application 602 to play on the computing device (e.g., on the microphone/speaker 158 included in the computing device 102c).

As described with reference to FIG. 2, a user can create the group of devices (e.g., My Group) by selecting one or more devices identified as available to the computing device 102c for providing (presenting, casting, or capturing and mirroring) content.

In some implementations, a user can navigate to a settings interface included on a computing device. The settings interface can include a selection for setting up casting using the computing device and cast-enabled external devices that are near, on the same wired or wireless network, or in communication with the computing device. The cast user interface 618 can include a devices tab 616 (a devices selection). The user can select the devices tab 616 and be provided with the example cast user interface 618. In this example, the cast identifier 610 provides an indication of the content (e.g., a music playlist) being captured and mirrored from the music application 602 to an available group of devices 520 (e.g., the available group of devices 520 as shown in FIG. 5C). In some implementations, the cast identifier 610 can allow a user to select, enter, or input an identifier (e.g., a name) for the content they would like to provide (present, cast, or capture and mirror) to the available group of devices 520 as shown in FIG. 5C.

Referring to FIG. 5C, the audio content (e.g., a music playlist) being played on the computing device (e.g., on the microphone/speaker 158 included in the computing device 102c) by the music application 602 can be captured and mirrored by the music application 602 and provided/casted to the available group of devices 520 created by and selected by the user (e.g., My Group). The available group of devices 520 includes two display devices (e.g., the external first display device 114 and the external second display device 164) and two speakers (e.g., speakers 118a-b). The content includes audio content that is captured and mirrored by the music application 602 executing on the computing device 102c to the external first display device 114 for playing on the built-in speakers 126a-b. The audio content is captured and mirrored by the music application 602 executing on the computing device 102c to the external second display device 164 for playing on the built-in speakers 166a-b. The audio content is captured and mirrored by the music application 602 executing on the computing device 102c to the speakers 118a-b.

The example shown in FIGS. 6A-B can be referred to as group audio mirroring. Group audio mirroring is the capturing and mirroring of audio content being played on computing device by a cast-enabled application executing on the computing device to an available group of cast-enabled devices.

Referring to FIG. 3, a user can be running a browser-based application in a tab (e.g., the tab 308) of a web browser application (e.g., the web browser application 110). The browser-based application may be capable of presenting, providing, casting, or capturing and mirroring audio content (e.g., streaming audio and/or streaming video) included in the tab 308 to a selected available device or to a selected available group of devices. The user can select an available device from the available devices 304a-d that the computing device 102c can present, provide, cast, or capture and mirror the audio content included in the tab 308 to the selected available device. The user can select the group 306 of devices that the computing device 102c can present, provide, cast, or capture and mirror the audio content included in the tab 308 to each device included in the group 306 of devices.

Referring, for example, to FIG. 5C, the audio content of the browser-based application executing in the tab (e.g., the tab 308) of the web browser application (e.g., the web browser application 110) can be presented, provided, casted, or captured and mirrored to the available group of devices 520 created by and selected by the user (e.g., My Group). The available group of devices 520 includes two display devices (e.g., the external first display device 114 and the external second display device 164) and two speakers (e.g., speakers 118a-b). A computing device (e.g., the computing device 102c) can provide (present, cast, or capture and mirror) the audio content to the external first display device 114 for playing on the built-in speakers 126a-b. The computing device (e.g., the computing device 102c) can provide (present, cast, or capture and mirror) the audio content to the external second display device 164 for playing on the built-in speakers 166a-b. The computing device (e.g., the computing device 102c) can provide (present, cast, or capture and mirror) the audio content to the speakers 118a-b.

A browser-based application presenting, providing, casting, or capturing and mirroring audio content (e.g., streaming audio and/or streaming video) included in a tab of a web browser application to a selected available device or to a selected available group of devices can be referred to as tab audio casting.

FIGS. 7A-F are diagrams that show providing (presenting, casting, or capturing and mirroring) of selected content (e.g., a television (TV) station) by a computing device (e.g., the computing device 102c) to a selected device (e.g., one or more of the available devices 204a-d as shown in FIG. 2) or to a selected available group of devices (e.g., My Group as shown in FIG. 2). As described with reference to FIG. 1, the available group of devices can include the first display device 114, the second display device 164, and the speakers 118a-b.

FIG. 7A is a diagram that shows an example user interface 700 for a cast-enabled application (e.g., a television application 702). A display device (e.g., the display device 124) of a computing device (e.g., the computing device 102c) can display the user interface 700. For example, a user can launch the television application 702 included on the computing device 102c.

The user interface 700 includes a cast icon 704. A user can select the cast icon 704 in order to provide (present, cast, or capture and mirror) content from the television application 702 to an identified external device or to a group of devices. The user interface includes a current station indication 736 and a set station selection 734. For example, the user can select the set station selection 734 to select a different (change) the current television station.

FIG. 7B is a diagram that shows an example cast user interface 718 that includes a my group indicator 712, a bedroom indicator 714, a living room indicator 722, a basement indicator 724, and a kitchen indicator 728 included in a devices tab 716 of the cast user interface 718, where a user has selected to provide content to a group of devices (e.g., My Group). A display device (e.g., the display device 124) of a computing device (e.g., the computing device 102c) can display the cast user interface 718.

In some implementations, a display device (e.g., the display device 124) of a computing device (e.g., the computing device 102c) can display the cast user interface 718 in response to a user selecting the cast icon 704. A cast identifier 710 can provide an indication of the content (e.g., a TV station) being provided (presented, cast, or captured and mirrored) to an available group of devices 720 (e.g., My Group) as shown in FIG. 7C. As described with reference to FIG. 2, a user can create the group of devices (e.g., My Group) by selecting one or more devices identified as available to the computing device 102c for providing (presenting, casting, or capturing and mirroring) content.

In some implementations, a user can navigate to a settings interface included on a computing device. The settings interface can include a selection for setting up casting using the computing device and cast-enabled external devices that are near, on the same wired or wireless network, or in communication with the computing device. The cast user interface 718 can include a devices tab 716 (a devices selection). The user can select the devices tab 716 and be provided with the example cast user interface 718. In this example, the cast identifier 710 provides an indication of the content (e.g., a television station) being provided (presented, cast, or captured and mirrored) to a group of devices associated with the name "My Group" (e.g., the available group of devices 720 as shown in FIG. 7F). In some implementations, the cast identifier 710 can allow a user to select, enter, or input an identifier (e.g., a name) for the content they would like to provide (present, cast, or capture and mirror) to the available group of devices 720 as shown in FIG. 7F.

FIG. 7C is a diagram that shows an example cast user interface 740 where a user has selected to provide content to a selected single device (e.g., the device associated with the bedroom indicator 714). For example, referring to FIG. 7F, the external first display device 114 can be associated with the bedroom indicator 714. In some implementations, a user may select to provide the content (visual and audio content) first to the external first display device 114 by selecting the bedroom indicator 714 as shown in FIG. 7C. The external first display device 114 can present the visual content 764 in the display area 150 and can play the audio content on the built-in speakers 126a-b. A user can choose to further select one or more "audio zones" (one or more additional devices) that can play the audio content.

For example, the user can select an add audio zone button 730 in included in the example cast user interface 740. Once selected, as shown in the diagram of FIG. 7D, an example cast user interface 742 can provide selection buttons 732a-c that can allow a user to select devices associated with the living room indicator 722, the kitchen indicator 728, and the basement indicator 724 as providing an additional audio zone (the selected device can play the audio content). In the example shown in FIG. 7D, a user has selected to provide the audio content to the device associated with the kitchen indicator 728 by selection the button 732b. Referring to FIG. 7F, the device associated with the kitchen indicator 728 can be the speaker 118a.

FIG. 7E is a diagram that shows an example cast user interface 744 that includes a notation that the device associated with the kitchen indicator 728 has been selected as an audio zone. The device will receive audio content for playing (e.g., the audio content is provided to the speaker 118a for playing on the speaker 118a).

FIG. 7F is a diagram that shows content provided (presented, casted, or captured and mirrored) by a computing device (e.g., the computing device 102c) to an available group of devices 720 created by and selected by the user (e.g., My Group). The available group of devices 720 includes two display devices (e.g., the external first display device 114 and the external second display device 164) and two speakers (e.g., speakers 118a-b). The content includes visual content 764 (e.g., a TV station newscast, streaming video content of a newscast) that is provided (presented, casted, or captured and mirrored) by a computing device (e.g., the computing device 102c) to the external first display device 114 for presenting in the display area 150. The content includes audio content that is provided (presented, casted, or captured and mirrored) by a computing device (e.g., the computing device 102c) to the external first display device 114 for playing on the built-in speakers 126a-b. The content is also provided (presented, casted, or captured and mirrored) by the computing device (e.g., the computing device 102c) to the external second display device 164 for playing of the audio portion of the content on the built-in speakers 166a-b. The content is also provided (presented, casted, or captured and mirrored) by the computing device (e.g., the computing device 102c) to the speakers 118a-b so that the audio portion of the content can be played on the speakers 118a-b.

As described, in some cases, a user may select a single device that receives audio and video (image) content and then separately select one or more additional devices that can function as audio zones. The additional device will be provided and will only play the audio content.

The example shown in FIGS. 7A-F can be referred to as audio group with extended video casting. Audio group with extended video casting is the casting of video (image) information to a single device and the casting of the audio content to at least the single device and, additionally, to one or more additional devices. The user, using a user interface, can select each of the additional devices that can play the audio content. Each additional device that plays the audio content can be referred to as an audio zone.

In some implementations, the computing device (e.g., the computing device 102c) can provide (present, cast, or capture and mirror) the content including visual content 764 (e.g., a TV station newscast, streaming video content of a newscast) and audio content to the external first display device 114 and the external second display device 64. The visual content 764 (e.g., a TV station newscast, streaming video content of a newscast) can be presented in the display area 150 of the external first display device 114 and in the display area 170 of the external second display device 164. The audio content can be played on the built-in speakers 126a-b of the external first computing device 114 and the built-in speakers 166a-b of the external second display device 164. These implementations can be referred to as group video casting. Group video casting is the casting of video content by a computing device executing a cast-enabled application to an available group of cast-enabled devices.

In some implementations, a user can control the playback of content by a computing device that is providing (presenting, casting, or capturing and mirroring) the content to external devices, such as external display devices and external speakers. For example, a user con control the volume of the audio content being played by external speakers. The user can control the playback of the content (e.g., pause, rewind, fast forward, next, previous, play, stop, mute) being played by external devices. In some implementations, a user may have a master control that provides control for all devices of a particular type that are included in the available group of devices. For example, a user may have a master volume control for all speakers included in the available group of devices.

Figure 8:
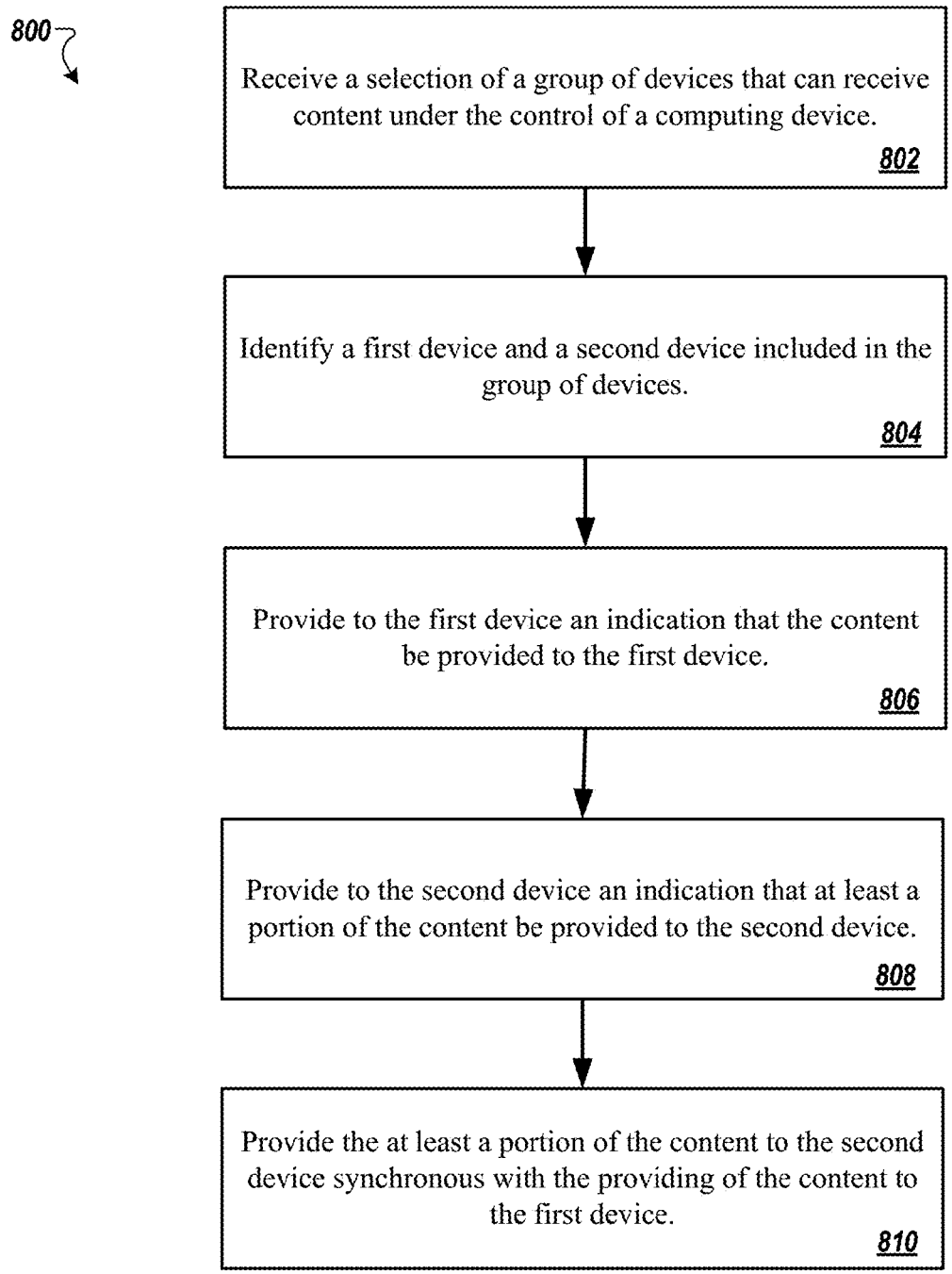
FIG. 8 is a flowchart that illustrates a method for a computing device to provide, present, cast, or capture and mirror content to one or more external devices.

FIG. 8 is a flowchart that illustrates a method 800 for a computing device to provide, present, cast, or capture and mirror content to one or more external devices. In some implementations, the systems described herein can implement the method 800. For example, the method 800 can be described referring to FIGS. 1, 2, 3, 4, 5A-C, 6A-B, and 7A-F.

A selection of a group of devices that can receive content under the control of the computing device is received (block 802). For example, referring to FIG. 3, a user can select to cast the content of a tab or instance of a web browser application to an available group of devices (e.g., the group 306 (My Group)) that a user may have created (e.g., as described with reference to FIG. 2). In another example, referring to FIG. 4, a user can select to cast content of a cast-enabled application to an available group of devices (e.g., the group 406 (My Group)) that a user may have created (e.g., as described with reference to FIG. 2).

A first device and a second device included in the group of devices is identified (block 804). The first device and the second device can be available to receive content under the control of the computing device. For example, referring to FIG. 1, the first display device 114 and the speaker 118a can be included in the group of devices. The computing device (e.g., the computing device 102c) can identify the first display device 114 and the speaker 118a to receive content under the control of the computing device 102c. Provide to the first device an indication that the content be provided to the first device (block 806). Provide to the second device an indication that at least a portion of the content be provided to the second device (block 808). For example, referring to FIG. 5, a user can select a cast icon (e.g., the cast icon 504) in order to provide (present, cast, or capture and mirror) content from an application (e.g., the music radio application 502) to an identified external device or to a group of devices.

Provide the at least a portion of the content to the second device synchronous with the providing of the content to the first device (block 810). For example, referring to FIG. 5, an application (e.g., the music radio application 502) can synchronize the audio content provided to each speaker included in the available group of devices.

Figure 9:
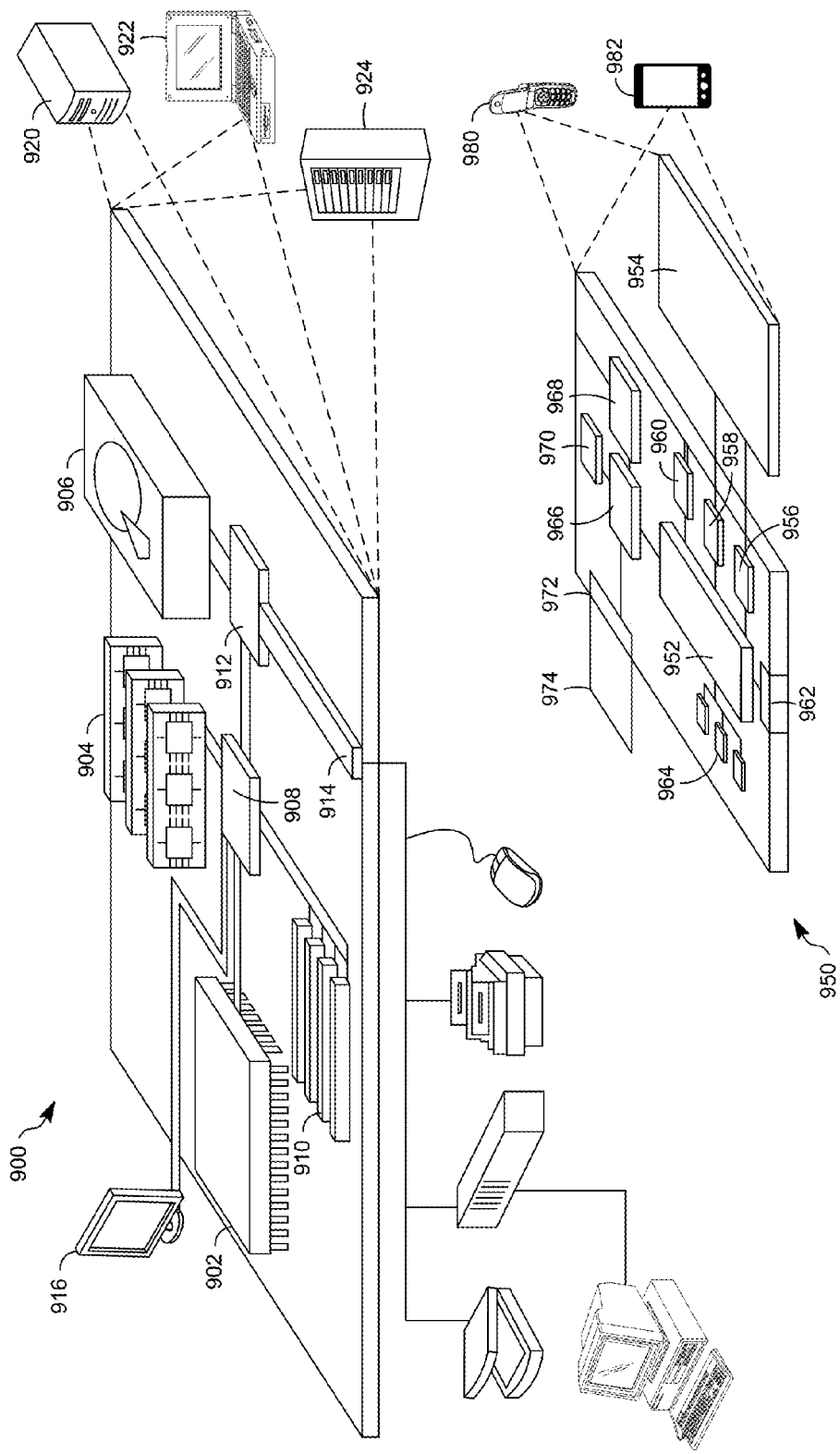
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   creating, by a casting application executing on a computing device, a group of cast-enabled devices, each device included in the group of cast-enabled devices able to receive content under control of the computing device and from a server remote from the group of cast-enabled devices, each device included in the group of cast-enabled devices being connected to the computing device and to the server by way of a network;
   establishing, by the computing device by way of the network, communications with the server;
   executing, by the computing device, a web browser application;
   displaying, on a display device included in the computing device and by a browser-based application executing in an instance of the web browser application, a first user interface including a video portion of streaming media content and a cast icon;
   in response to receiving a selection of the cast icon, displaying, on the display device and by the browser-based application, a second user interface including the video portion of the streaming media content, the cast icon, and a pull-down menu superimposed over the video portion of the streaming media content and including a listing of the cast-enabled devices and the group of cast-enabled devices; and
   in response to receiving a selection of the group of cast-enabled devices, controlling, by the browser-based application, the streaming media content for input to each of the cast-enabled devices included in the group of cast-enabled devices, the browser-based application providing the streaming media content synchronously for input to each of the cast-enabled devices.

2. The method of claim 1,
   wherein the method further comprises casting an audio portion of the streaming media content to the group of devices.

3. The method of claim 1,
   wherein a first device included in the group of cast-enabled devices is a display device including a display area and at least one built-in speaker, and wherein the method further comprises playing an audio portion of the streaming media content on the at least one built-in speaker.

4. The method of claim 1,
wherein a first device included in the group of cast-enabled devices is a first speaker, wherein a second device included in the group of cast-enabled devices is a second speaker, and
wherein the method further comprises playing an audio portion of the streaming media content on the first speaker and the second speaker.

5. The method of claim 1,
wherein an audio portion of the streaming media content is for playing on a speaker included in the computing device, and
wherein the method further comprises mirroring the audio portion of the streaming media content to the group of devices.

6. The method of claim 1,
wherein the method further comprises casting the streaming media content to the group of devices.

7. The method of claim 1,
wherein a first device included in the group of cast-enabled devices is a display device including a display area and at least one built-in speaker,
wherein a second device included in the group of cast-enabled devices is a speaker, and
wherein the method further comprises:
  playing the streaming media content on the first device, the playing including:
    displaying the video portion of the streaming media content in the display area; and
    playing an audio portion of the streaming media content on the at least one built-in speaker; and
  playing the audio portion of the streaming media content on the second device.

8. The method of claim 1,
wherein the method further comprises:
  displaying the video portion of the streaming media content on the display device included in the computing device;
  playing an audio portion of the streaming media content on a first device included in the group of cast-enabled devices, the playing being synchronized with the displaying of the video portion of the streaming media content on the display device; and
  playing the audio portion of the streaming media content on a second device included in the group of cast-enabled devices, the playing being synchronized with the displaying of the video portion of the streaming media content on the display device.

9. A non-transitory, machine-readable medium having instructions stored thereon, the instructions, when executed by a processor, cause a computing device to:
  create, by a casting application executing on the computing device, a group of cast-enabled devices, each device included in the group of cast-enabled devices able to receive content under control of the computing device and from a server remote from the group of cast-enabled devices, each device included in the group of cast-enabled devices being connected to the computing device and to the server by way of a network;
  establish, by the computing device by way of the network, communications with the server;
  execute a web browser application;
  display, on a display device included in the computing device and by a browser-based application executing in an instance of the web browser application, a first user interface including a video portion of streaming media content and a cast icon;
  in response to receiving a selection of the cast icon, display, on the display device and by the browser-based application, a second user interface including the video portion of streaming media content, the cast icon, and a pull-down menu superimposed over the video portion of the streaming media content and including a listing of the cast-enabled devices and the group of cast-enabled devices; and
  in response to receiving a selection of the group of cast-enabled devices, control, by the browser-based application, the streaming media content for input to each of the cast-enabled devices included in the group of cast-enabled devices, the browser-based application providing the streaming media content synchronously for input to each of the cast-enabled devices.

10. The medium of claim 9,
wherein the instructions, when executed by the processor, further cause the computing device to cast an audio portion of the streaming media content to the group of devices.

11. The medium of claim 9,
wherein a first device included in the group of cast-enabled devices is a display device including a display area and at least one built-in speaker, and
wherein the instructions, when executed by the processor, further cause the computing device to play an audio portion of the streaming media content on the at least one built-in speaker.

12. The medium of claim 9,
wherein a first device included in the group of cast-enabled devices is a first speaker, wherein a second device included in the group of cast-enabled devices is a second speaker, and
wherein the instructions, when executed by the processor, further cause the computing device to play an audio portion of the streaming media content on the first speaker and the second speaker.

13. The medium of claim 9,
wherein an audio portion of the streaming media content is for playing on a speaker included in the computing device, and
wherein the instructions, when executed by the processor, further cause the computing device to mirror the audio portion of the streaming media content to the group of devices.

14. The medium of claim 9,
wherein the instructions, when executed by the processor, further cause the computing device to cast the streaming media content to the group of devices.

15. The medium of claim 9,
wherein a first device included in the group of cast-enabled devices is a display device including a display area and at least one built-in speaker,
wherein a second device included in the group of cast-enabled devices is a speaker, and
wherein the instructions, when executed by the processor, further cause the computing device to:
  play the streaming media content on the first device, the playing including:
    displaying the video portion of the streaming media content in the display area; and
    playing an audio portion of the streaming media content on the at least one built-in speaker; and play the audio portion of the streaming media content on the second device.

16. The medium of claim 9,
wherein the instructions, when executed by the processor, further cause the computing device to:
    display the video portion of the streaming media content on the display device included in the computing device;
    play an audio portion of the streaming media content on a first device included in the group of cast-enabled devices, the playing being synchronized with the displaying of the video portion of the streaming media content on the display device; and
    play the audio portion of the streaming media content on a second device included in the group of cast-enabled devices, the playing being synchronized with the displaying of the video portion of the streaming media content on the display device.

17. A system comprising:
a network;
a computing device connected to the network and configured to execute a casting application, a web browser application, and a browser-based application, the computing device including a display device;
a server;
a first device external to the computing device and connected to the network, the first device included in a group of cast-enabled devices configured to receive content under control of the computing device and from the server; and
a second device external to the computing device and connected to the network, the second device included in the group of cast-enabled devices configured to receive content under the control of the computing device and from the server;
the computing device configured to:
    communicate with the server by way of the network,
    display, on the display device and by the browser-based application executing in an instance of the web browser application, a first user interface including a video portion of streaming media content and a cast icon;
    in response to receiving a selection of the cast icon, display, on the display device and by the browser-based application, a second user interface including the video portion of the streaming media content, the cast icon, and a pull-down menu superimposed over the video portion of the streaming media content and including a listing of the cast-enabled devices and the group of cast-enabled devices; and
    in response to receiving a selection of the group of cast-enabled devices, control, by the browser-based application, the streaming media content for input to each of the cast-enabled devices included in the group of cast-enabled devices, the browser-based application providing the streaming media content synchronously for input to each of the cast-enabled devices.

18. The system of claim 17,
wherein the first device included in the group of cast-enabled devices is a display device including a display area,
wherein the second device included in the group of cast-enabled devices is a speaker, and
wherein controlling, by the browser-based application, the streaming media content for input to each of the cast-enabled devices included in the group of cast-enabled devices further includes synchronizing the playing of an audio portion of the streaming media content on the speaker with the playing of the video portion of the streaming media content in the display area of the display device.

\* \* \* \* \*